July 21, 1925.  B. C. SMITH ET AL  1,547,073
VALVE FOR FLUSH TANKS
Filed Oct. 14, 1924
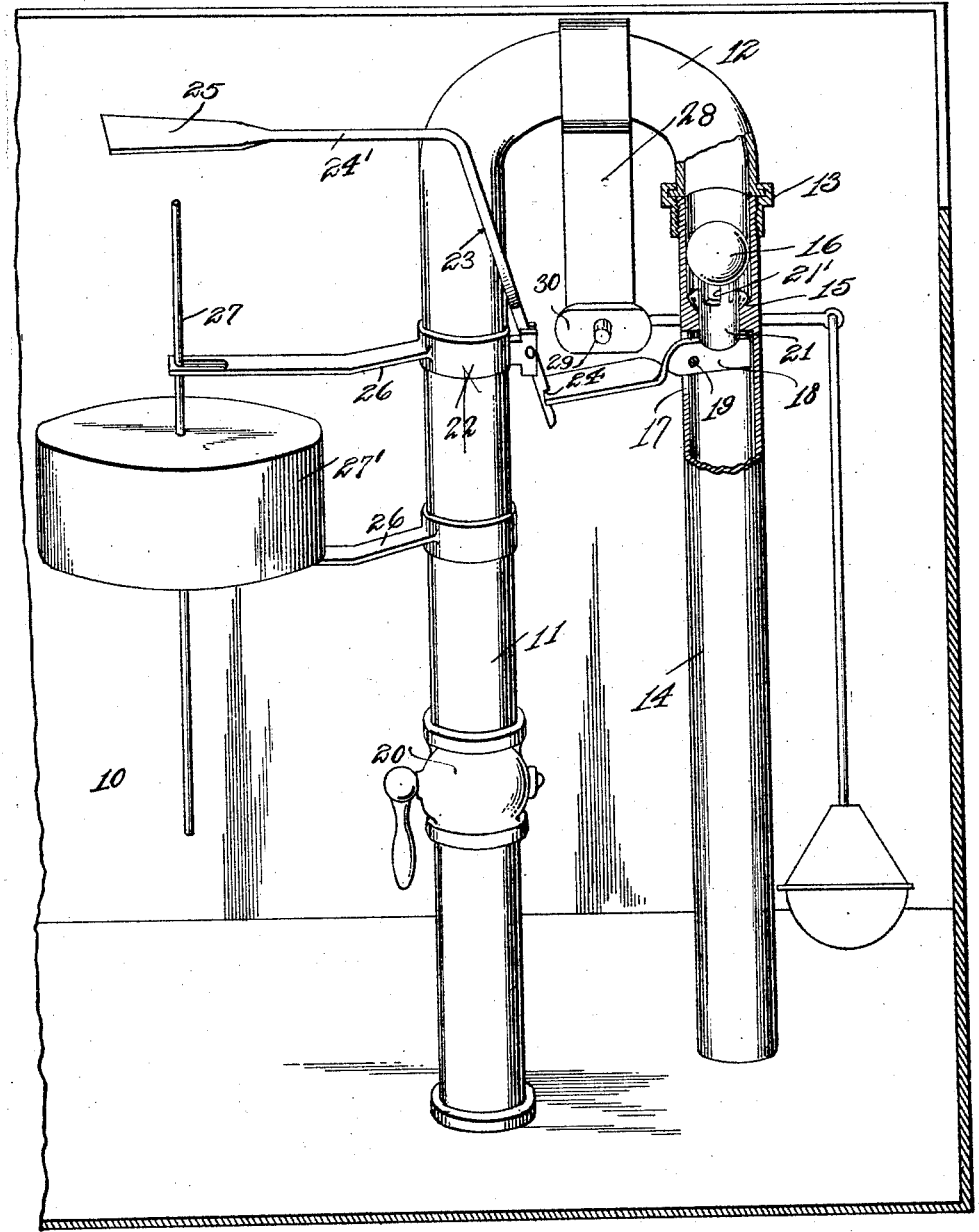
Inventors
Bertram C. Smith
Sterling E. Stump
Attorney Patented July 21, 1925.

UNITED STATES PATENT OFFICE.

BERTRAM C. SMITH AND STERLING E. STUMP, OF RED LION, PENNSYLVANIA.

VALVE FOR FLUSH TANKS.

Application filed October 14, 1924. Serial No. 743,594.

*To all whom it may concern:*

Be it known that we, BERTRAM C. SMITH and STERLING E. STUMP, citizens of the United States, residing at Red Lion, in the county of York, State of Pennsylvania, have invented certain new and useful Improvements in Valves for Flush Tanks; and we do hereby declare the following to be a full, clear, and exact description of the invention, such as will enable others skilled in the art to which it appertains to make and use the same.

This invention relates to new and useful improvements in flush tanks, and particularly to inlet valves therefor.

One object of the invention is to provide an inlet valve for a flush tank which is normally held in closed position to prevent entrance of water to the tank, and which is released by the means which opens the outlet valve, operating through an intermediate means.

Another object is to provide an inlet valve for a flush tank which is controlled by a float, but which is not directly operable by the float.

Another object is to provide a flush tank valve which is held in closed position by the pressure of water, and which is moved from its seat by a float operated mechanism.

Other objects and advantages will be apparent from the following description when taken in connection with the accompanying drawing.

In the drawing:

The figure is a perspective view of a flush tank inlet valve mechanism made in accordance with the invention, and partly broken away.

Referring particularly to the accompanying drawing, 10 represents a portion of a flush tank, in the bottom of which is secured the lower end of the vertical inlet pipe 11. The upper end of the pipe 11 is laterally and downwardly curved, as shown at 12, and secured in the downwardly directed portion of the curved part, by means of the union 13, is a depending pipe 14, which terminates adjacent the bottom of the tank, to discharge the water into the tank, and thereby obviate the rushing and splashing of the water. Within the upper end of the pipe 14 there is disposed a seat 15, on which the ball valve 16 is arranged to seat. Disposed through a slot 17, in the side of the pipe 14, is one end of a lever 18, said lever being pivotally supported on the pipe at 19. The other end of the lever is disposed adjacent the pipe 11, for a purpose which will presently appear herein. In the vertical pipe 11 there is disposed a cut-off valve 20, which cuts off the flow of water through the pipe 11, to permit removal of the pipe 14, and the repair or renewal of the valve. Resting on the end of the lever 18 which lies within the pipe 14 is a vertically extending tube 21, the upper end of which is formed with a number of notches 21', and receives thereon the ball valve 16. When the lever is rocked in one direction the tube 21 is pushed upwardly, lifting the valve 16 from its seat and permitting water to flow from the pipe into the tank. When the lever is rocked in the other direction the tube 21 will be lowered and permit the ball 16 to rest on the seat, whereupon the pressure of water from above the ball will force the same tightly on the seat, thus cutting off the flow of water to the tank.

Mounted on the pipe 11, adjacent the free end of the lever 18, is a bracket 22, and pivotally supported on this bracket is a bent lever 23, the lower end of which is disposed in close proximity to the free end of the lever 18, and is provided with a notch 24 into which the said end of the lever is arranged to engage. The upper end of the lever 23 extends horizontally rearward of the pipe 11, as shown at 24', where it is provided with a flat portion 25.

Mounted on the pipe 11 are the two arms 26, and slidable vertically through said arms are the ends of the vertically disposed rod 27, a float body 27' being secured to the rod intermediate the arms. The before-mentioned flat portion 25 is disposed over the upper end of the said rod 27, and in position to be engaged and lifted thereby, when the float rises with the water in the tank.

In normal position, that is when the tank is full of water, the float will be elevated, with the rod in engagement with the lever 23. At the same time the tube 21 will be in its lowermost position, with the ball 16 resting in its seat, and the outer end of the lever 18 in elevated position. The pressure of the water on the ball holds the tube and lever in such position.

Carried by the bight portion of the pipe 11, and depending therefrom, is a hanger 28, which rotatably supports the adjacent end of a shaft 29. The other end of the shaft is adapted to receive a handle of the conventional type, (not shown), disposed outside of the tank, and arranged to be grasped to rock the shaft, to lift the outlet valve (not shown), but which will be readily understood. On the shaft, and overlying the free end of the lever 18, is an elongated member 30, which, when the shaft is rocked in either direction, will engage with and depress the adjacent end of the lever to cause the other end of said lever to lift the tube 21, and thereby raise the ball 16 from the seat, with the result that water may freely pass into the tank. As the water rises in the tank the float will be lifted, and when the upper end of the rod 27 engages and rocks the lever 23, that end of the lever 18 which has been engaged in the notch 24, will be released from the notch and permitted to rise under the downward force of the ball and tube, under the influence of the pressure of water on the upper side of the ball.

What is claimed is:

1. In a flush tank mechanism, an inlet pipe, a float supported on the pipe, a ball valve in the pipe, a rocker having an end disposed in said pipe and its other end projecting therefrom, a cage in the pipe beneath the valve and supported on said rocker end, a member rotatable by the handle of the flush tank for depressing the projecting end of the said rocker to elevate said cage and lift the valve from its seat, and a pivoted lever having one end disposed in releasable engagement with said rocker to hold the latter in cage elevating position and having its other end lying in the path of the float to be released from the rocker thereby.

2. In a flush tank mechanism, an inlet pipe, a float supported on the pipe, a ball valve seated in the pipe, a rocker arm mounted on the pipe and having an end disposed within the pipe beneath the valve, a cage slidable through the seat of the valve and arranged to engage and lift the valve from its seat, a rotatable member operable by the flushing handle of the tank for depressing the other end of said rocker, and a notched lever mounted on the pipe in position to engage and hold the said other end of the rocker, said lever having an end disposed in the path of the float for actuation thereby to release the lever from the rocker.

3. In a flush tank mechanism, an inlet pipe, a vertically slidable float on the pipe, a valve in the pipe, a vertically slidable member loosely supporting the valve, a rocker mounted on the pipe and having an end movable within the pipe in supporting relation to the valve supporting member and its other end projecting from the pipe, a flushing handle carried rotary member for depressing the projecting end of the rocker to elevate the slidable member and valve, and a lever supported on said pipe having one end arranged to engage beneath the projecting end of said lever to hold the lever in valve unseating position and its other end arranged in the path of the rising float.

In testimony whereof, we affix our signatures.

BERTRAM C. SMITH.
STERLING E. STUMP.